United States Patent
Lei et al.

(10) Patent No.: US 10,664,223 B2
(45) Date of Patent: May 26, 2020

(54) METHODS AND APPARATUS FOR MAPPING VIRTUAL SURFACE TO PHYSICAL SURFACE ON CURVED DISPLAY

(71) Applicant: ATI Technologies ULC, Markham (CA)

(72) Inventors: Jun Lei, Markham (CA); Syed Athar Hussain, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 15/606,619

(22) Filed: May 26, 2017

(65) Prior Publication Data
US 2018/0343428 A1 Nov. 29, 2018

(51) Int. Cl.
G06F 3/147 (2006.01)
G06F 3/01 (2006.01)

(52) U.S. Cl.
CPC .............. *G06F 3/147* (2013.01); *G06F 3/013* (2013.01); *G09G 2354/00* (2013.01); *G09G 2370/04* (2013.01); *G09G 2380/02* (2013.01)

(58) Field of Classification Search
CPC ........................................................ H04J 1/00
See application file for complete search history.

(56) References Cited

U.S. PATENT DOCUMENTS

| 4,439,762 A | * | 3/1984 | Van Vliet | G09G 5/391 345/534 |
| 2013/0155047 A1 | * | 6/2013 | Williams | G06T 15/205 345/419 |
| 2016/0196794 A1 | * | 7/2016 | Kim | G09G 3/3611 345/690 |

OTHER PUBLICATIONS

Oh et al. "Visual Presence: Viewing Geometry Visual Information of UHD S3D Entertainment", p. 3358-3371, ieee Tran. On Image Proc. vol. 25, No. 7, 2016.*

* cited by examiner

*Primary Examiner* — Yingchun He
(74) *Attorney, Agent, or Firm* — Faegre Drinker Biddle & Reath LLP

(57) ABSTRACT

Methods and apparatus provide pixel information for display. In one example, the methods and apparatus map, using a computing device, pixel information of a virtual rendering surface to a physical curved display screen based on field-of-view point reference data and display curvature data of one or more curved displays using a non-constant scale ratio among a plurality of differing physical pixels in at least one row of a portion of the physical curved display screen. Display data is output based on the mapped pixel information for display to the one or more curved displays.

20 Claims, 9 Drawing Sheets

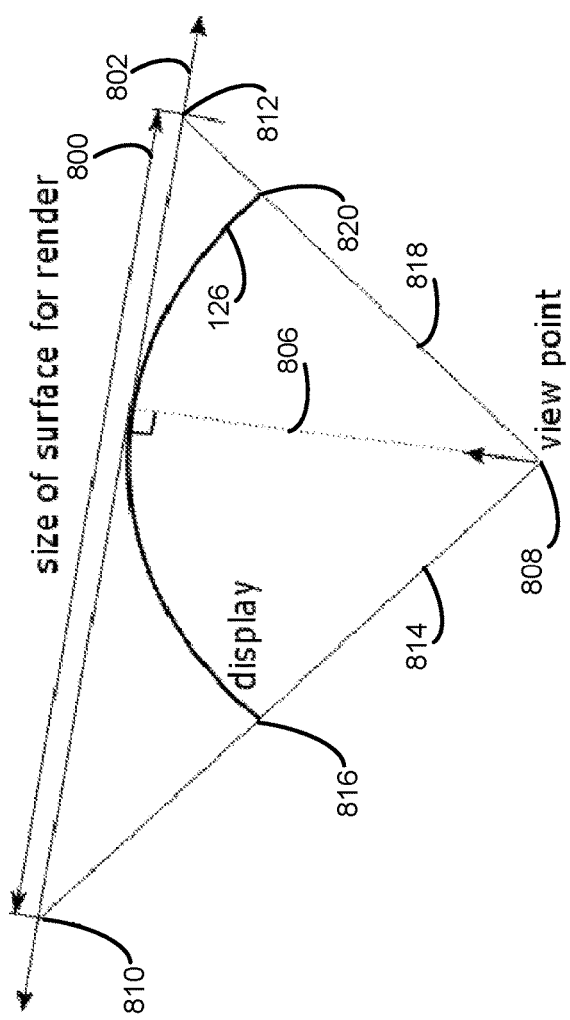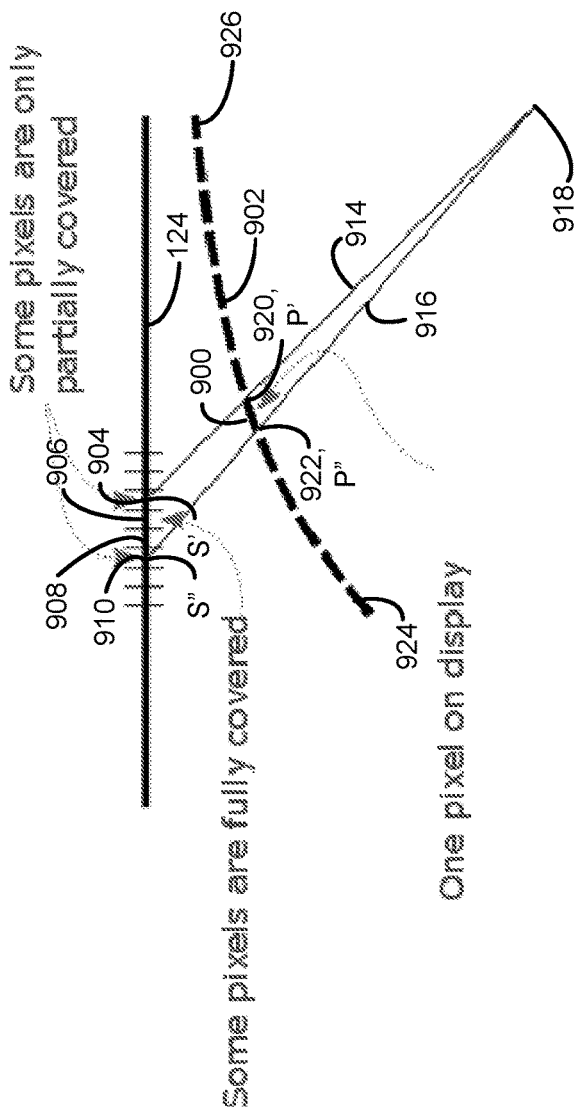

METHODS AND APPARATUS FOR MAPPING VIRTUAL SURFACE TO PHYSICAL SURFACE ON CURVED DISPLAY

BACKGROUND OF THE DISCLOSURE

The disclosure relates generally to methods and apparatus for providing pixel information for display, and more particularly to methods and apparatus for displaying an image on a curved display.

Display images are made up of millions of tiny dots, where each dot is one of thousands or billions of colors. These dots are known as picture elements, or "pixels." Each pixel has multiple attributes associated with it, including at least color data represented by a number of value(s), index or other representative pixel information stored in a computer system. A display image, although displayed using a two dimensional array of pixels, in fact is created by rendering of a plurality of image objects.

Graphics processors, such as GPUs or APUs, are used to display the image objects. A graphics processor typically receives image processing instructions and generates primitives that form the basis for a back-end's work. The back-end of the processor receives the primitives and performs the operations necessary to send the data to a frame buffer where it will eventually be rendered to a physical display. More complex structures, such as three dimensional objects, are formed from a combination or mesh of such primitives.

To display a particular scene on a display device having a two-dimensional screen, the visible primitives associated with the scene are drawn individually by determining those pixels that fall within the edges of the primitive, and obtaining the attributes of the primitive that correspond to each of those pixels. As an example, the obtained attributes are used to determine the displayed color or contrast values of applicable pixels.

However, the particular scene includes a predetermined number of pixels in a virtual rendering surface of a screen space having X (e.g., width) and Y (e.g., height) coordinates. A bounding box defined by minimum and maximum coordinates is created based on the screen space X and Y coordinates to limit the number of pixels displayed on a physical display screen of the display device. Rows and columns of the virtual rendering surface in the bounding box are typically mapped to corresponding rows and columns of the physical display screen for displaying the particular scene in the bounding box on the display device.

FIG. 1 illustrates conventional methods of mapping the virtual rendering surface to the physical display screen for display. In one example, for a flat display device 100, a viewing position 102 of a user is utilized to create a bounding box. Pixels on a virtual rendering surface 104 in the bounding box are respectively mapped to a physical display screen 106 using a constant scale ratio. In one example, each physical pixel of the physical display screen 106 is mapped to a constant number of virtual pixels on the virtual rendering surface 104. Similarly, in another example, for a curved display device 110, a viewing position 112 of the user is utilized to create a bounding box. Pixels on a virtual rendering surface 114 in the bounding box are respectively mapped to a physical display screen 116 in the constant scale ratio.

Conventional mapping methods shown in FIG. 1 employ the constant scale ratio between virtual pixels of the virtual rendering surface and corresponding physical pixels of the physical display screen. In this configuration, each physical pixel is mapped to a constant number of virtual pixels throughout the display device. However, it has been determined that when the physical pixels are displayed on the flat or curved display device 100, 110, an image content of the corresponding virtual rendering surface can be distorted. This distortion effect is, for example, commensurate with a degree of curvature of the curved display device 110. As such, the image content is increasingly distorted toward lateral side edges of the curved display device 110. Thus, a degraded image quality or appearance is provided to the user.

Accordingly, there exists a need for improved method and apparatus for displaying an image on a curved display in order to address one or more of the above-noted drawbacks.

BRIEF DESCRIPTION OF THE DRAWINGS

The embodiments will be more readily understood in view of the following description when accompanied by the below figures and wherein like reference numerals represent like elements, wherein:

FIG. 8 is an exemplary pictorial representation of a bounding box in plan view with respect to the curved display device in accordance with one embodiment set forth in the disclosure;

FIG. 9 is an exemplary pictorial representation of a mapping method between virtual pixels of the virtual rendering surface and physical pixels of the physical display screen in plan view in accordance with one embodiment set forth in the disclosure;

DETAILED DESCRIPTION OF EMBODIMENTS

Figure 1:
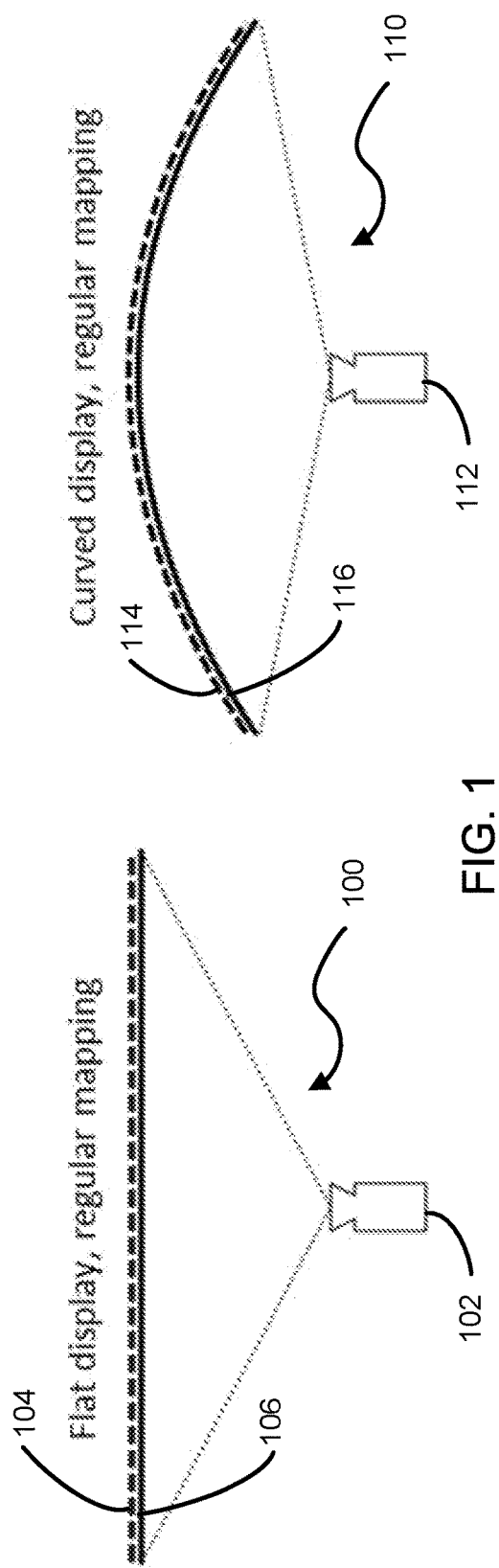
FIG. 1 is a pictorial representation of a conventional method of mapping a virtual rendering surface to a physical display screen for display in plan view.

Briefly, in one example, methods and apparatus provide pixel information for display, and improve image quality for curved displays by employing a non-constant scale ratio among physical pixels across one or more curved displays. The method and apparatus maps pixel information of a virtual rendering surface, such as a screen space generated by a GPU or other component and stored in memory, to a physical curved display screen based on field-of-view point reference data, such as a distance between a user and the curved display screen, and display curvature data, such as a degree of curvature of the curved display screen, of one or more curved displays using a non-constant scale ratio among a plurality of differing physical pixels, such as adjacent or neighboring pixels, in at least one row of a portion of the physical curved display screen. Display data, such as one or more of color, contrast, intensity, and brightness data, is output based on the mapped pixel information for display to the one or more curved displays.

In this example, the term "pixel information" includes any information related to an image pixel and/or subpixel, providing data representative of at least color information or other data representative of pixel information, such as color, contrast, intensity, alpha value, pixel index or location value, and the like. In this example, the term "row" refers to a display line having a set of multiple pixels that define at least a curved portion of a curved display. Thus, in one embodiment, the row is positioned horizontally with respect to the curvature of the curved display. In another embodiment, the row is positioned vertically with respect to the curvature of the curved display. Other arrangements of the row are also contemplated to suit the application.

Among other advantages, for example, the method and apparatus provides more image content to be displayed on the one or more curved displays when compared to prior techniques. Further, the method and apparatus substantially reduces image distortions associated with the one or more curved displays during operation. A non-constant scale ratio between virtual pixels of a virtual rendering surface and physical pixels of a physical curved display screen is employed to achieve increased image content and enhanced image qualities on the one or more curved displays. In one example, the non-constant scale ratio allows for applying a different number of virtual pixels to a different physical pixel in the at least one row of the portion of the physical curved display screen. More specifically, the scale ratio between physical pixels and virtual pixels mapped to corresponding physical pixels is different per each physical column in the curved portion of the physical curved display screen.

In one example, the field-of-view point reference data is received from a user or device, and the display curvature data is based on one or more display capability attribute data, such as a display resolution, a pixel ratio, and/or a radius of curvature on the curved display screen, received via a data communication, such as an Extended Display Identification (EDID), from the curved displays. The method and apparatus provides a mapping technique between the virtual pixels and the physical pixels based on the field-of-view point reference data and the display curvature data. This mapping information is consistent with respect to a viewing position point associated with the field-of-view point reference data, and thus the mapping information is dynamically updated as the viewing position point changes in real time. Consequently, the method and apparatus provides dynamic image changes during operation. Other advantages will be recognized by those of ordinary skill in the art.

In another example, using the non-constant scale ratio includes applying a different number of virtual pixels to a different physical pixel in the at least one row of the portion of the physical curved display screen. As discussed above, the scale ratio between each physical pixel and corresponding virtual pixels is variable per each physical column in the curved portion of the physical curved display screen. In yet another example, using the non-constant scale ratio includes increasing and/or decreasing the different number of virtual pixels based on a location, such as a position close to an edge of the curved display screen, of a single physical pixel, such as a picture element of a graphic or video image, on the physical curved display screen with respect to the field-of-view point reference data.

In one embodiment, mapping the pixel information of the virtual rendering surface includes detecting a change, such as movement of the user, in a field-of-view point; and changing the mapping of the pixel information of the virtual rendering surface to the physical curved display screen based on the detected change. In another embodiment, mapping the pixel information of the virtual rendering surface includes determining the display curvature data based on the display capability attribute data associated with the one or more curved displays.

In one example, prior to mapping the pixel information of the virtual rendering surface to the physical curved display screen, the virtual rendering surface is generated that corresponds to a two-dimensional screen space in memory, such as a flat surface having X (width) and Y (height) coordinates, relative to the field-of-view point reference data. In another example, mapping the pixel information of the virtual rendering surface includes generating a bounding box, such as an area defined by the X and Y coordinates, having a plurality of rows (and/or columns) of virtual pixels that delimits at least a portion (e.g., either flat or curved) of the virtual rendering surface that is to be displayed on the physical curved display screen based on the field-of-view point reference data and the display curvature data. In one example, the physical curved display screen includes a curved portion on the physical display screen. In another example, the physical curved display screen includes a non-curved (e.g., flat) portion on the physical display screen. Any combination of curved and non-curved portions on the physical display screen is contemplated to suit different applications.

In yet another example, mapping the pixel information of the virtual rendering surface includes calculating, in response to generating the bounding box of the virtual rendering surface, the non-constant scale ratio for at least one row of the plurality of rows of virtual pixels in the bounding box by associating more than one virtual pixel to a single physical pixel of the physical curved display screen. Thus, in this example, the scale ratio between each physical pixel and corresponding virtual pixels is non-constant across each row of the physical curved display screen. However, the scale ratio is constant across a single physical column of the physical curved display screen. As a result, the scale ratio varies per each physical column in the curved portion of the physical curved display screen. In this way, each physical pixel represents the associated more than one virtual pixels. In one embodiment, mapping the pixel information of the virtual rendering surface includes mapping the single physical pixel of the physical curved display screen to the associated more than one virtual pixel for at least one row of the plurality of rows of virtual pixels in the bounding box.

In another example, outputting display data, such as color, contrast, intensity, and/or brightness data, based on the mapped pixel information for display includes generating the display data of the plurality of differing physical pixels of the physical curved display screen that represent corresponding virtual pixels of the virtual rendering surface. In yet another example, the plurality of differing physical pixels are displayed on the one or more curved displays based on the display data.

Figure 2:
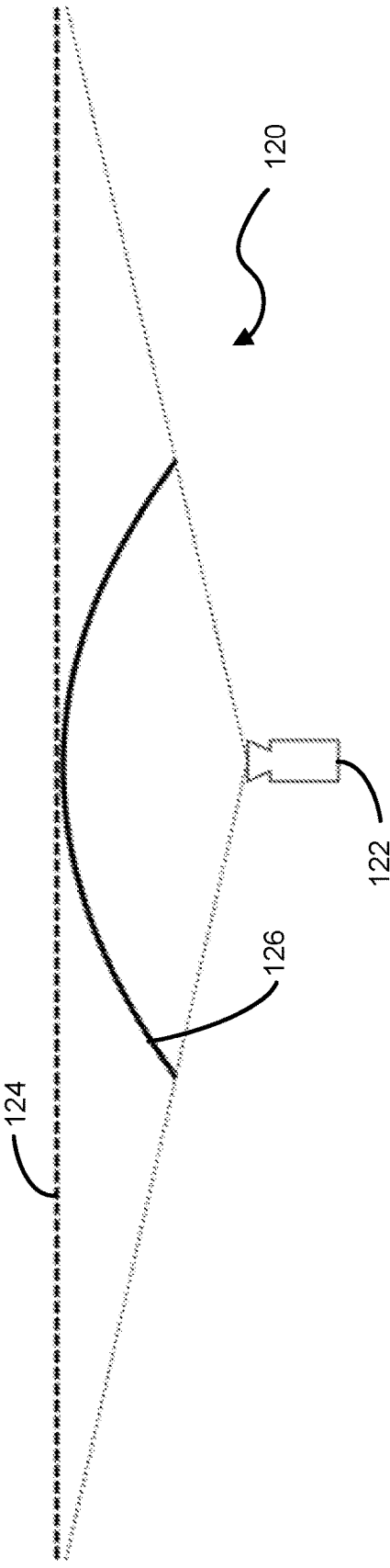
FIG. 2 is a pictorial representation of mapping a virtual rendering surface to a physical display screen on a curved display device in plan view in accordance with one embodiment set forth in the disclosure.

FIG. 2 illustrates an exemplary method of mapping a virtual rendering surface to a physical display screen on a curved display device in plan view in accordance with one embodiment set forth in the disclosure. In this example, for a curved display device 120, a viewing position 122 of the user is utilized to create a bounding box. Pixels on a virtual rendering surface 124 in the bounding box are mapped to a physical display screen 126 using a non-constant scale ratio on at least a portion of the physical display screen 126. Unlike prior systems, the virtual rendering surface 124 defined by the bounding box with respect to the viewing position 122 includes more virtual pixels represented by physical pixels of the physical display screen 126 than a conventional bounding box configuration.

In one embodiment, the curved display device 120 includes at least one curved portion on the physical display screen 126. In another embodiment, the curved display device 120 includes a non-curved portion on the physical display screen 126 (e.g., a flat screen portion). Any combinations of curved and non-curved portions are contemplated to suit different applications. Detailed descriptions of the mapping method and apparatus are provided below in paragraphs related to FIGS. 3-11.

Figure 3:
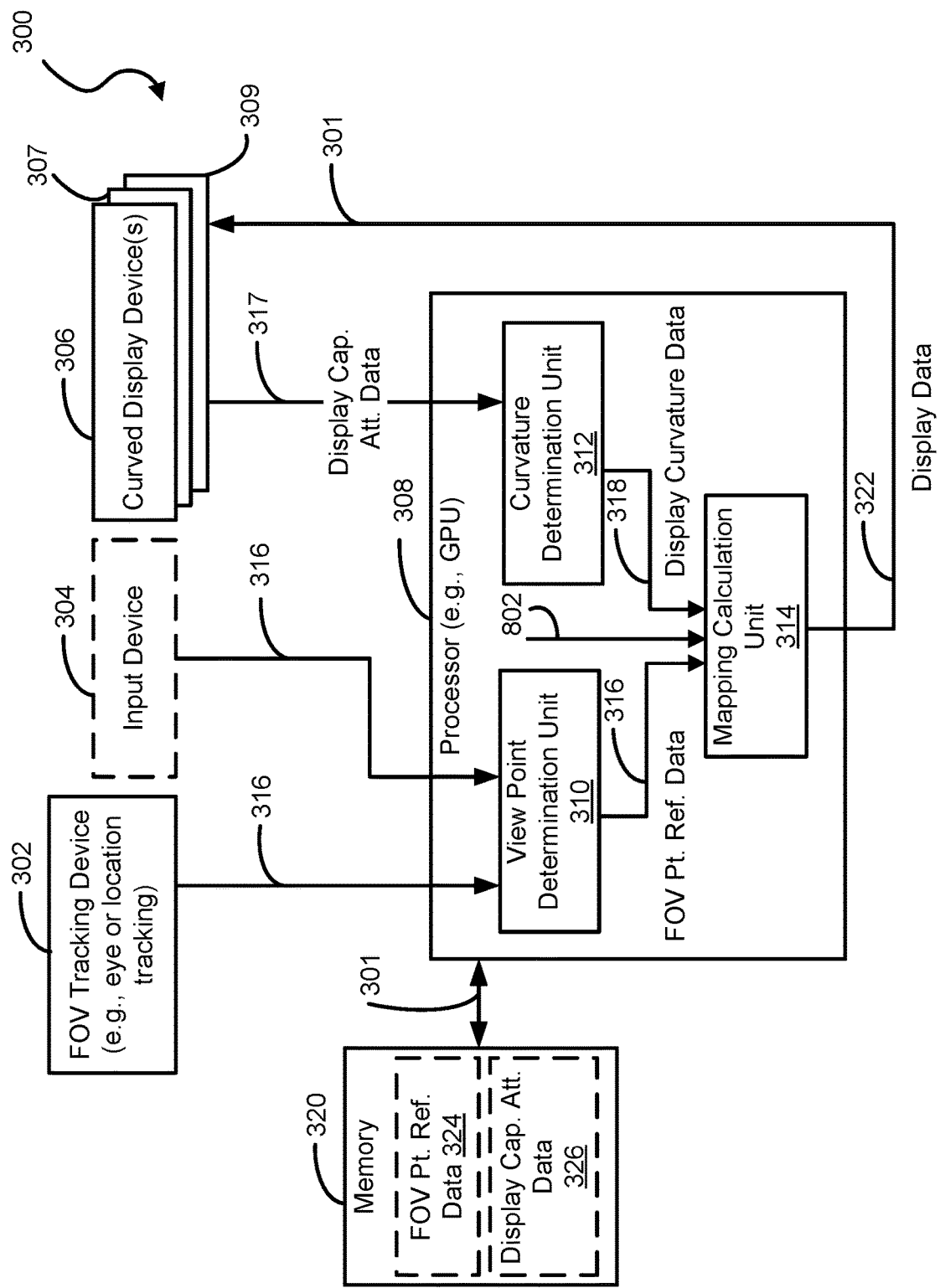
FIG. 3 is a block diagram illustrating one example of an apparatus for processing pixel information in accordance with one embodiment set forth in the disclosure.

FIG. 3 illustrates one example of an apparatus 300 for processing pixel information in accordance with embodiments of the disclosure. The apparatus 300 includes any type of computing device suitable for implementing aspects of embodiments of the disclosed subject matter. Examples of computing devices include but are not limited to "workstations," "servers," "laptops," "desktops," "tablet computers," "hand-held devices," "game consoles," "monitors," "general-purpose graphics processing units (GPGPUs)," "APUs," "GPUs," processors and the like, all of which are contemplated within the scope of FIG. 3, with reference to various components of the system 300 and/or apparatus 300.

In one embodiment, the apparatus 300 includes a field-of-view (FOV) tracking device 302 (e.g., eye or location tracking), an optional input device 304, one or more curved display devices 306, 307, 309 and at least one processor 308 that are operatively coupled to each other using suitable communication links. Any number of components, different components, and/or combinations of components is included in the apparatus 300. For example, the optional input device 304 includes a microphone, a joystick, a wireless device, a keyboard, a pen, a voice input device, and a touch input device, a touch-screen device, an interactive display device, a mouse, and/or the like, or components can be excluded.

Although the units 310, 312, and 314 are illustratively depicted as separate units, the functions and capabilities of each unit can be implemented, combined, and used in conjunction with/into any unit or any combination of units to suit different applications. In one example, the units 310, 312, and 314 resides in one or more processors (e.g., cores) for executing instructions. In some embodiments, the apparatus 300 includes a number of processors 308, a number of FOV tracking devices 302, a number of input devices 304, a number of curved display devices 306, 307, 309 and the like to suit the application. Additionally, any number of these components, or combinations thereof, is distributed and/or duplicated across a number of computing devices.

Embodiments of the present disclosure are described below by way of example only, with reference to the accompanying drawings. Further, the following description is merely exemplary in nature and is in no way intended to limit the disclosure, its application, or uses. As used herein, the term "unit" refers to, be part of, or include an Application Specific Integrated Circuit (ASIC), an electronic circuit, a processor or microprocessor (shared, dedicated, or group) or portion thereof and/or memory (shared, dedicated, or group) that executes one or more software or firmware programs, a combinational logic circuit, and/or other suitable components that provide the described functionality. Other implementation techniques are equally employed, such as programmable logic arrays and state machines. Thus, while this disclosure includes particular examples and arrangements of the units, the scope of the present system should not be so limited since other modifications will become apparent to the skilled practitioner.

In this example, the processor 308 includes a view point determination unit 310 that is configured to obtain a FOV point reference data 316 (FOV Pt. Ref. Data) from one or more sources, such as the FOV tracking device 302, the input device 304, or memory 320, and determine which FOV point reference data 316 to use for operation. For example, the FOV point reference data 316 includes gaze data and three-dimensional eye position data. The gaze data includes two-dimensional coordinate information relative to a physical screen surface of the curved display devices 306, 307, 309 (e.g., where eyes are looking). If the eyes are not looking at the screen surface, it is defaulted that the eyes are looking at a center of the curved display devices 306, 307, 309. The eye position data includes three-dimensional coordinate information relative to the screen surface of the curved display devices 306, 307, 309. For example, the three-dimensional coordinate information includes an X coordinate value representing horizontal information, a Y coordinate value representing vertical information, and a Z coordinate value representing depth information (e.g., a distance away from the screen surface). In one example, the FOV point reference data 316 is data representing a location of the user (e.g., using a GPS locator), a distance from the curved display devices 306, 307, 309 (e.g., in millimeters), or the like. In another example, the FOV point reference data 316 is converted into the gaze data and the three-dimensional eye position data for consistency, and a partial conversion is also allowable when the coordinate information is trackable.

In one embodiment, the FOV point reference data 316 is received from the FOV tracking device 302 by tracking an eye or location of a user. In another embodiment, the FOV point reference data 316 is manually received from the input device 304 indicating a user input location specified by a cursor position, an application focus, or the like. In yet another embodiment, the FOV point reference data 316 is received from the memory 320 having a stored value 324 related to the FOV point reference data 316 using, for example, a configuration table or a default static FOV point reference data based on a common usage model for the display devices 306, 307, 309. Other suitable techniques for obtaining the FOV point reference data 316 are equally employed to suit different applications. However, the view point determination unit 310 is optional and is not needed where the FOV point reference data 316 is stored for the mapping calculation unit 314 or if the apparatus already has one source for the FOV point reference data 316.

Also included in the processor 308 is a curvature determination unit 312 that is configured to obtain display capability attribute data 317 (Display Cap. Att. Data) from one or more sources, such as the curved display device 306 or the memory 320, and determine which display capability attribute data 317 to use for operation. However, in another embodiment, no determination is necessary where the display curvature data 318 comes from a single source. In one embodiment, the display capability attribute data 317 is received from the curved display device 306. In one example, the display capability attribute data 317 of each display 306, 307, 309 are transmitted over a wired or wireless bus in the form of an Extended Display Identification Data (EDID)/Enhanced EDID (E-DID) structure. Other suitable structures, such as DisplayID, are employed to suit different applications.

In this example, the curvature determination unit 312 determines display curvature data 318 (Display Curvature Data) based on the display capability attribute data 317 associated with the one or more curved displays 306. For example, the display curvature data 318 represents a degree of curvature of the curved portion of the curved display device 306. In another example, the display curvature data 318 includes data representing radius information of the display device, and physical pixel resolution of the display device (e.g., 640×480, 1024×768, etc.).

In another embodiment, the display capability attribute data 317 is received from the memory 320 having a stored value 326 related to the display capability attribute data 317 associated with the curved display devices 306, 307, 309. For example, the display capability attribute data 317 include not only curvature configuration information of each curved display 306, 307, 309, but also other content delivery information (e.g., 640×480, 1280×720, or 1920×1080 pixel resolution), such as a connection speed, an image size, a maximum visible display size, a maximum display resolution, a picture aspect ratio, and the like. In one example, the content delivery information is stored in a look-up table in the memory 320, or received in the EDID form via the bus. In another example, each curved display 306, 307, 309 provides at least some of the curvature configuration or content delivery information (e.g., the display resolution) in the EDID form, which is stored as a read-only memory (ROM) during manufacturing. Additional information, such as the curvature information, can be presented in the EDID form via the bus, or can be in a look-up table in the memory 320. Those having skill in the art will appreciate that other techniques for obtaining the display capability attribute data 317 are equally employed.

In one embodiment, the memory 320 included in the apparatus 300 has computer-readable media in the form of volatile and/or nonvolatile memory and is removable, non-removable, or a combination thereof. Media examples include Random Access Memory (RAM); Read Only Memory (ROM); Electronically Erasable Programmable Read Only Memory (EEPROM); flash memory; optical or holographic media; magnetic storage devices and/or any other medium that can be used to store information and can be accessed by a computing device such as, for example, quantum state memory, and/or the like. A distributed memory system shared in one or more servers (e.g., web servers or non-web servers) is also contemplated to suit different applications.

In one embodiment, a mapping calculation unit 314 is configured to receive the field-of-view point reference data 316 (FOV Pt. Ref. Data) and the display curvature data 318 (Display Curvature Data), and map pixel information of the virtual rendering surface 124 to a physical curved display screen based on the field-of-view point reference data 316 and the display curvature data 318 of one or more curved display devices 306, 307, 309 using a non-constant scale ratio among a plurality of differing physical pixels in at least one row of a portion of the physical curved display screen. Prior to mapping the pixel information of the virtual rendering surface 124 to the physical curved display screen, the mapping calculation unit 314 generates the virtual rendering surface 124 corresponding to a two-dimensional screen space relative to the field-of-view point reference data 316, as described further below with respect to FIG. 8.

During operation, the view point determination unit 310 detects a change in the FOV point reference data 316, automatically tracks the change in the FOV point reference data 316, and changes the mapping of the pixel information of the virtual rendering surface 124 to the physical curved display screen based on the detected change. Subsequently, the mapping calculation unit 314 outputs display data 322 based on the mapped pixel information to the curved display devices 306, 307, 309 for display.

In this example, the term "pixel information" includes any information related to an image pixel and/or subpixel, providing data representative of at least color information or other data representative of pixel information, such as color, contrast, intensity, alpha value, pixel index or location value, and the like. In this example, the term "row" refers to a display line having a set of multiple pixels that define at least a curved portion of the curved display device 306. Thus, in one embodiment, the row is positioned horizontally with respect to the curvature of the curved display device 306. In another embodiment, the row is positioned vertically with respect to the curvature of the curved display device 306. Other arrangements of the row are also contemplated to suit the application.

Further, the non-constant scale ratio is measured between virtual pixels of a virtual rendering surface and physical pixels of a physical curved display screen such that a different number of virtual pixels is applied to a different physical pixel in the at least one row of the portion of the physical curved display screen. In one embodiment, the different number of virtual pixels is increased or decreased based on a location of a single physical pixel on the physical curved display screen with respect to the field-of-view point reference data. Detailed description of the non-constant scale ratio is provided below in paragraphs related to FIG. 9.

The illustrative apparatus 300 shown in FIG. 3 is not intended to suggest any limitation as to the scope of use or functionality of embodiments of the present disclosure. Neither should the illustrative apparatus 300 be interpreted as having any dependency or requirement related to any single component or combination of components illustrated therein. For example, various components depicted in FIG. 3 are, in embodiments, integrated with various ones of the other components depicted therein (and/or components not illustrated), all of which are considered to be within the ambit of the present disclosure.

Figure 4:
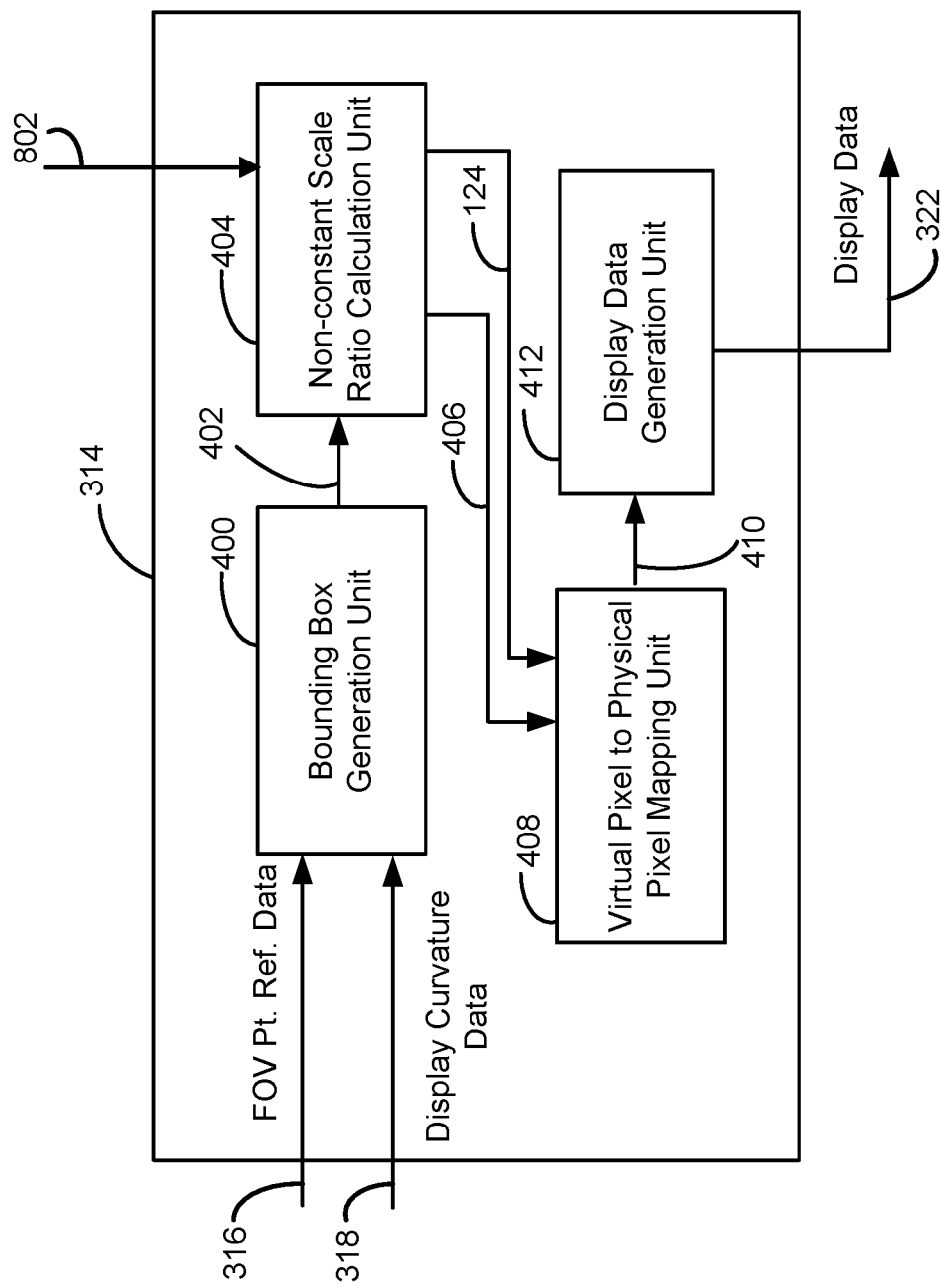
FIG. 4 is a block diagram illustrating an exemplary mapping calculation unit of the apparatus shown in FIG. 3.

FIG. 4 illustrates an exemplary mapping calculation unit 314 in accordance with embodiments of the disclosure. It is contemplated that the mapping calculation unit 314 includes a bounding box generation unit 400, a non-constant scale ratio calculation unit 404, a virtual pixel to physical pixel mapping unit 408, and a display data generation unit 412. Although these sub-units 400, 404, 408, 412 are illustrated as children units subordinate of the parent unit, each sub-unit can be operated as a separate unit from the unit 314, and other suitable combinations of sub-units are contemplated to suit different applications. In another embodiment, one or more units can be selectively bundled as a key software model running on the processor having software as a service (SSaS) features.

In response to determining the field-of-view point reference data 316 and the display curvature data 318, the bounding box generation unit 400 is configured to generate a bounding box 402 from the virtual rendering surface 124 based on the field-of-view point reference data 316 and the display curvature data 318. For example, the field-of-view point reference data 316 is used to project viewing rays beginning at the viewing position 122 shown in FIG. 2 along opposite edges of the physical display screen 126. In one embodiment, these viewing rays define a size of the bounding box 402. An exemplary method of generating the bounding box 402 of the virtual rendering surface 124 is described below in paragraphs relating to FIGS. 8 and 10. For example, the size of the bounding box 402 is defined by minimum and maximum coordinates based on the screen space X and Y coordinates (e.g., 1,280 pixels wide and 720 pixels tall) and limit the number of pixels displayed on a physical display screen of each display device 306, 307, 309. The bounding box 402 includes a plurality of rows of virtual pixels that delimits at least a portion of the virtual rendering surface 124 that is to be displayed on the physical curved display screen based on the field-of-view point reference data 316 and the display curvature data 318.

The non-constant scale ratio calculation unit 404 is configured to calculate, in response to generating the bounding box 402 of the virtual rendering surface 124, a non-constant scale ratio 406 for at least one row of the plurality of rows of virtual pixels by associating a single physical pixel of the physical curved display screen to more than one virtual pixel in the bounding box 402. Each physical pixel represents the associated virtual pixels. For example, color, contrast, and intensity information are all represented by RGB values. The RGB values are generalized in their abstract form (e.g., an integer or a floating point number with arbitrary minimum and maximum values). As another example, a family of various color spaces, such as YCbCr (luminance, blue-difference, and red-difference), HSV (hue, saturation, and value), HSL (hue, saturation, and lightness), or the like, are used to encode values representing the associated virtual pixels. The virtual pixel to physical pixel mapping unit 408 is configured to map, in response to calculating the non-constant scale ratio 406, a single physical pixel of the curved display device 306, 307, 309 to more than one virtual pixel for at least one row of the plurality of rows of virtual pixels in the bounding box 402. A number of the virtual pixels corresponding to the single physical pixel changes based on a location of the single physical pixel on the physical curved display screen. An exemplary method of calculating the non-constant scale ratio 406 and mapping the virtual pixels to the physical pixels is described below in paragraphs relating to FIGS. 9 and 11. The mapped pixel information 410 is transmitted to the display data generation unit 412.

The display data generation unit 412 is configured to generate display data 322 of the plurality of differing physical pixels of the physical curved display screen for the display devices 306, 307, 309 based on the mapped pixel information 410. The display data 322 represents display information of the corresponding mapped virtual pixels in the bounding box 402. For example, the display data 322 includes data related to actual color balance, exposure, or contrast values for the single physical pixel, or other image attributes known in the art. In one embodiment, the display data generation unit 412 outputs the display data 322 to the one or more curved display devices 306, 307, 309 for display. The plurality of differing physical pixels are displayed on the one or more curved displays 306 based on the display data 322.

Figure 5:
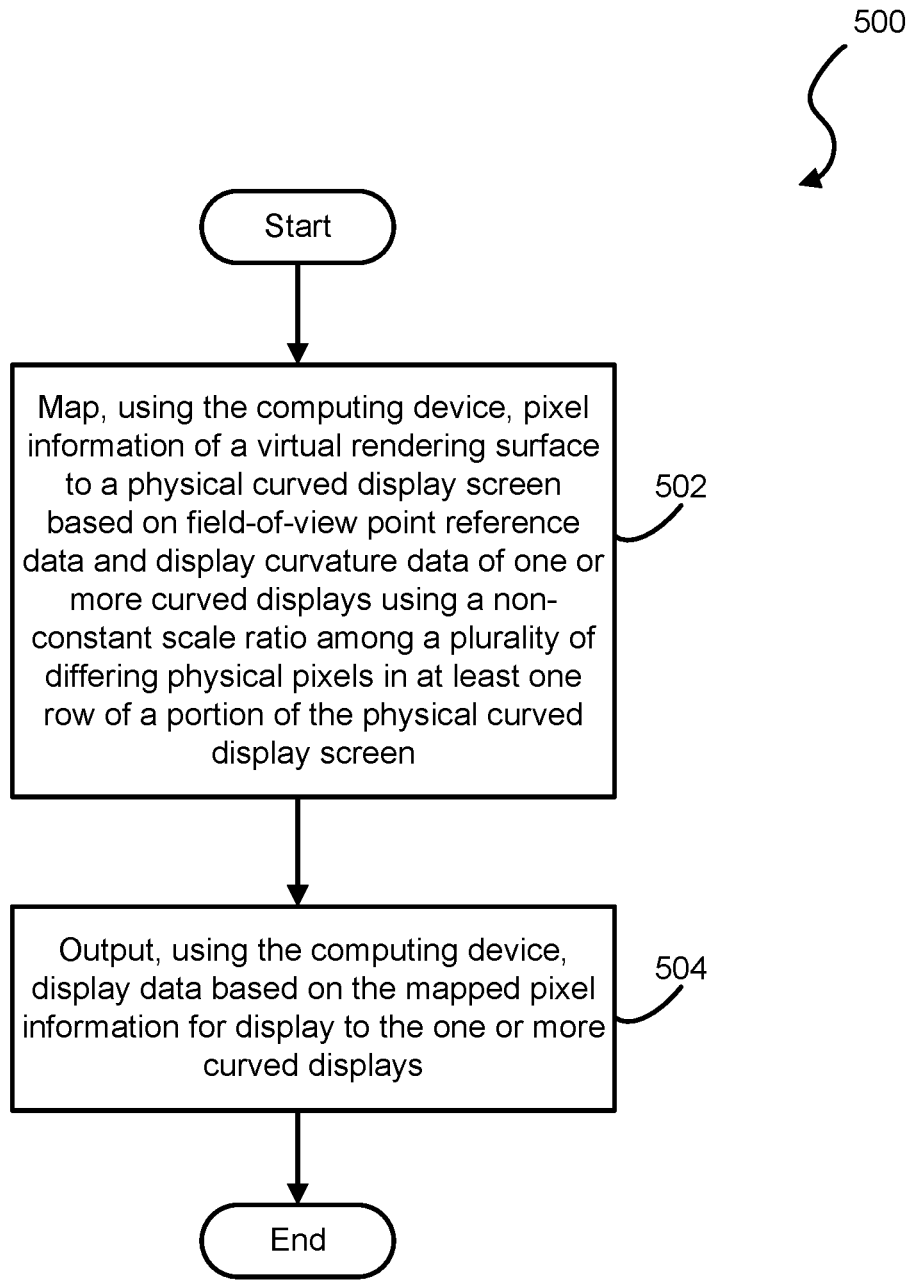
FIG. 5 is a flowchart illustrating one example of a method for processing pixel information in accordance with one embodiment set forth in the disclosure.

FIG. 5 illustrates one example of a method 500 for mapping pixel information to a physical curved display using a non-constant scale ratio. It will be described with reference to FIGS. 2-11. However, any suitable structure can be employed.

In operation, at block 502, the mapping calculation unit 314 maps pixel information of a virtual rendering surface 124 in the bounding box 402 to a physical curved display screen of the curved display devices 306, 307, 309 based on field-of-view point reference data 316 and display curvature data 318 of the curved display devices 306, 307, 309 using a non-constant scale ratio among a plurality of differing physical pixels in rows of the physical curved display screen. At block 504, the mapping calculation unit 314 outputs display data based on the mapped pixel information to the one or more curved display devices 306, 307, 309 for display. The blocks 502 and 504 are further illustrated in FIGS. 6 and 7.

Figure 6:
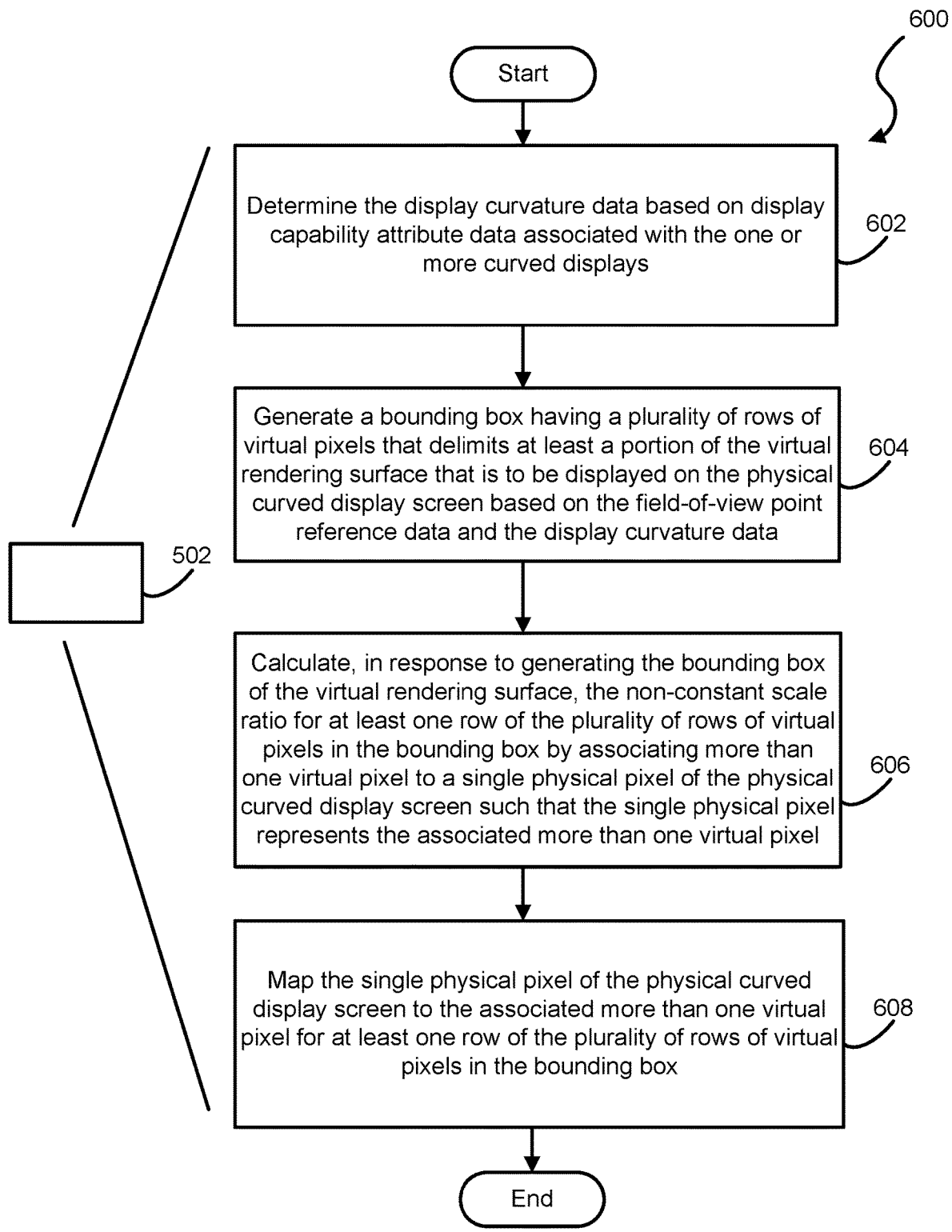
FIG. 6 is a flowchart illustrating another example of the method for processing pixel information in accordance with one embodiment set forth in the disclosure.

FIG. 6 illustrates one example of a method 600 for performing block 502 of FIG. 5 in accordance with one embodiment set forth in the disclosure. It will be described with reference to FIGS. 2-11. However, any suitable structure can be employed. Although four sub-blocks 602-608 are illustrated, other suitable sub-blocks can be employed to suit different applications. In one embodiment, at block 602, the curvature determination unit 312 determines the display curvature data 318 based on display capability attribute data 317 associated with the curved display devices 306, 307, 309.

At block 604, the bounding box generation unit 400 generates a bounding box having a plurality of rows of virtual pixels that delimits at least a portion of the virtual rendering surface 124 that is to be displayed on the physical curved display screen based on the field-of-view point reference data 316 and the display curvature data 318. FIG. 8 illustrates an exemplary bounding box represented by line 800 of a larger virtual rendering surface 802 in plan view with respect to the physical curved display screen 126. The virtual rendering surface 802 represents a two-dimensional screen space in memory that transverses to a viewing ray 806 beginning at a viewing position point 808 such that the viewing ray meets the virtual rendering surface at a right angle (90 degrees). For example, the field-of-view point reference data 316 includes positional data about the viewing position point 808, and the display curvature data 318 includes dimensional data about the physical curved display screen 126. Other suitable additional data about the physical curved display device 306 are also contemplated to suit different applications.

In this example, a width of the bounding box 800 is defined by a first end point 810 and an opposite second end point 812 disposed on the virtual rendering surface 802. The first end point 810 represents a first delimiting virtual pixel of the bonding box 800 on the virtual rendering surface 802 wherein the first end point is aligned along a first ray 814 beginning at the viewing position point 808 and passing through a first outermost lateral edge 816 of the physical curved display screen 126. The second end point 812 represents a second delimiting virtual pixel of the virtual rendering surface 802 wherein the second end point is aligned along a second ray 818 beginning at the viewing position point 808 and passing through a second opposite outermost lateral edge 820 of the physical curved display screen 126.

As such, the width of the bounding box 800 of the virtual rendering surface 802 is delimited by the first end point 810 and the second end point 812. In other embodiments, the width of the bounding box 800 is variable (e.g., narrower or wider) based on different first and second rays 814, 818 having different end points on the physical curved display screen 126. Other suitable delimiting techniques for the width of the bounding box 800 are also contemplated to suit different applications.

In one embodiment, a height of the bounding box 800 is identical to a height of the physical curved display screen 126. In other embodiments, the height of the bounding box 800 is variable, e.g., taller or shorter than the height of the physical curved display screen 126. Methods described above in delimiting the width of the bounding box 800 are similarly employed to delimit the height of the bounding box.

Returning to FIG. 6, proceeding to block 606, the non-constant scale ratio calculation unit 404 calculates, in response to generating the bounding box of the virtual rendering surface 124, the non-constant scale ratio for at least one row of the plurality of rows of virtual pixels in the bounding box by associating more than one virtual pixel to a single physical pixel of the physical curved display screen such that the single physical pixel represents the associated more than one virtual pixel. FIG. 9 illustrates an exemplary method of corresponding a single physical pixel 900 of a physical curved display screen 902 to one or more virtual pixels 904, 906, 908, 910 in plan view. In FIG. 9, a single row of a virtual rendering surface 124 in the bounding box is shown for illustration purposes, but other rows of the bounding box are processed in a similar manner described here.

In this example, the single physical pixel 900 corresponds to two entire virtual pixels 906, 908, and two partial virtual pixels 904, 910 based on a first ray 914 and a second ray 916. Both first and second rays 914, 916 begin from a common viewing position point 918. Specifically, the first ray 914 begins from the common viewing point 918 and passes through a first end point 920 of the single physical pixel 900, and the second ray 916 begins from the common viewing point 918 and passes through a second end point 922 of the single physical pixel 900. A width of the single physical pixel 900 is defined by the first end point 920 and the second end point 922. Both first and second rays 914, 916 are linearly projected on the bounding box 800 to determine a start corresponding virtual pixel (i.e., 904) and an end corresponding virtual pixel (i.e., 910) relative to the single physical pixel 900.

As such, the non-constant scale ratio between the single physical pixel 900 and the virtual pixels 904, 906, 908, 910 is approximately 1:2.8 because two virtual pixels 904, 910 are partially corresponding to the physical pixel 900. When another physical pixel 924 being close to a lateral edge of the physical curved display screen 902, the non-constant scale ratio would increase (e.g., 1:3.5) based on the display curvature data 318. Similarly, when another physical pixel 926 being close to a center point of the physical curved display screen 902, the non-constant scale ratio would decrease (e.g, 1:1.2) based on the display curvature data 318. In embodiments, the non-constant scale ratio varies depending on a screen configuration of each respective curved display device 306.

Returning to FIG. 6, proceeding to block 608, the virtual pixel to physical pixel mapping unit 408 maps the single physical pixel of the physical curved display screen to the associated more than one virtual pixel for at least one row of the plurality of rows of virtual pixels in the bounding box. As discussed above in FIG. 9, the number of virtual pixels 904, 906, 908, 910 corresponding to the single physical pixel 900 is approximately 2.8, and the number of virtual pixels corresponding to another physical pixel 924 increases to 3.5 as the location of the physical pixel approaches toward an outer periphery of the physical curved display screen 902. For example, the output periphery of the physical curved display screen 902 includes a first (or left) lateral side edge of the physical curved display screen 902, and a second (or right) opposite lateral side edge of the physical curved display screen.

Figure 7:
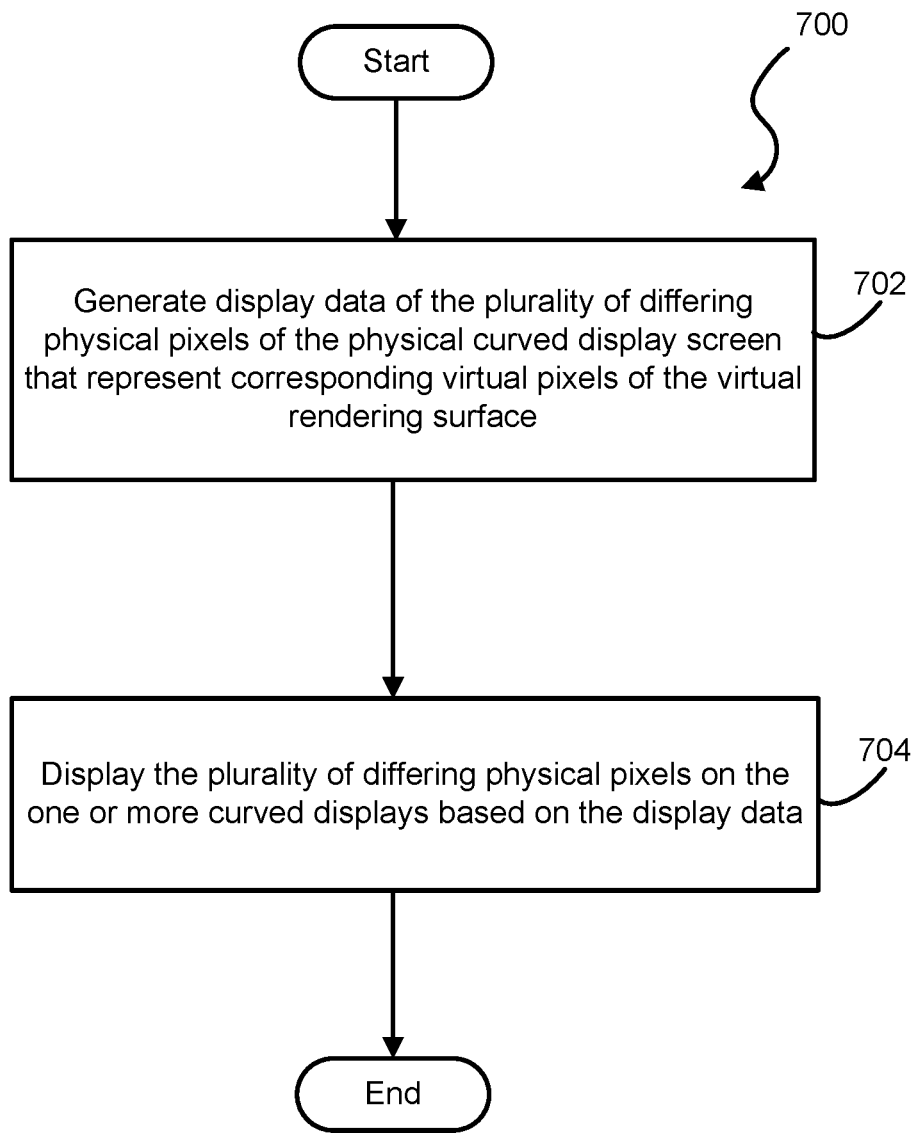
FIG. 7 is a flowchart illustrating yet another example of the method for processing pixel information in accordance with one embodiment set forth in the disclosure.

FIG. 7 illustrates one example of a method 700 for performing block 504 of FIG. 5 in accordance with one embodiment set forth in the disclosure. It will be described with reference to FIGS. 2-11. However, any suitable structure can be employed. Although four sub-blocks 702-704 are illustrated, other suitable sub-blocks can be employed to suit different applications. In one embodiment, at block 702, the display data generation unit 412 generates display data of the plurality of differing physical pixels of the physical curved display screen that represent corresponding virtual pixels of the virtual rendering surface 124. For example, the display data includes pixel information including at least one of: color, contrast, intensity, brightness, and the like, of the single physical pixel (e.g., 900 shown in FIG. 9). The display data of each physical pixel represents the corresponding mapped virtual pixels (e.g., 904-910 shown in FIG. 9). At block 704, the plurality of differing physical pixels is displayed on the one or more curved displays 306, 307, 309 based on the display data.

Figure 10:
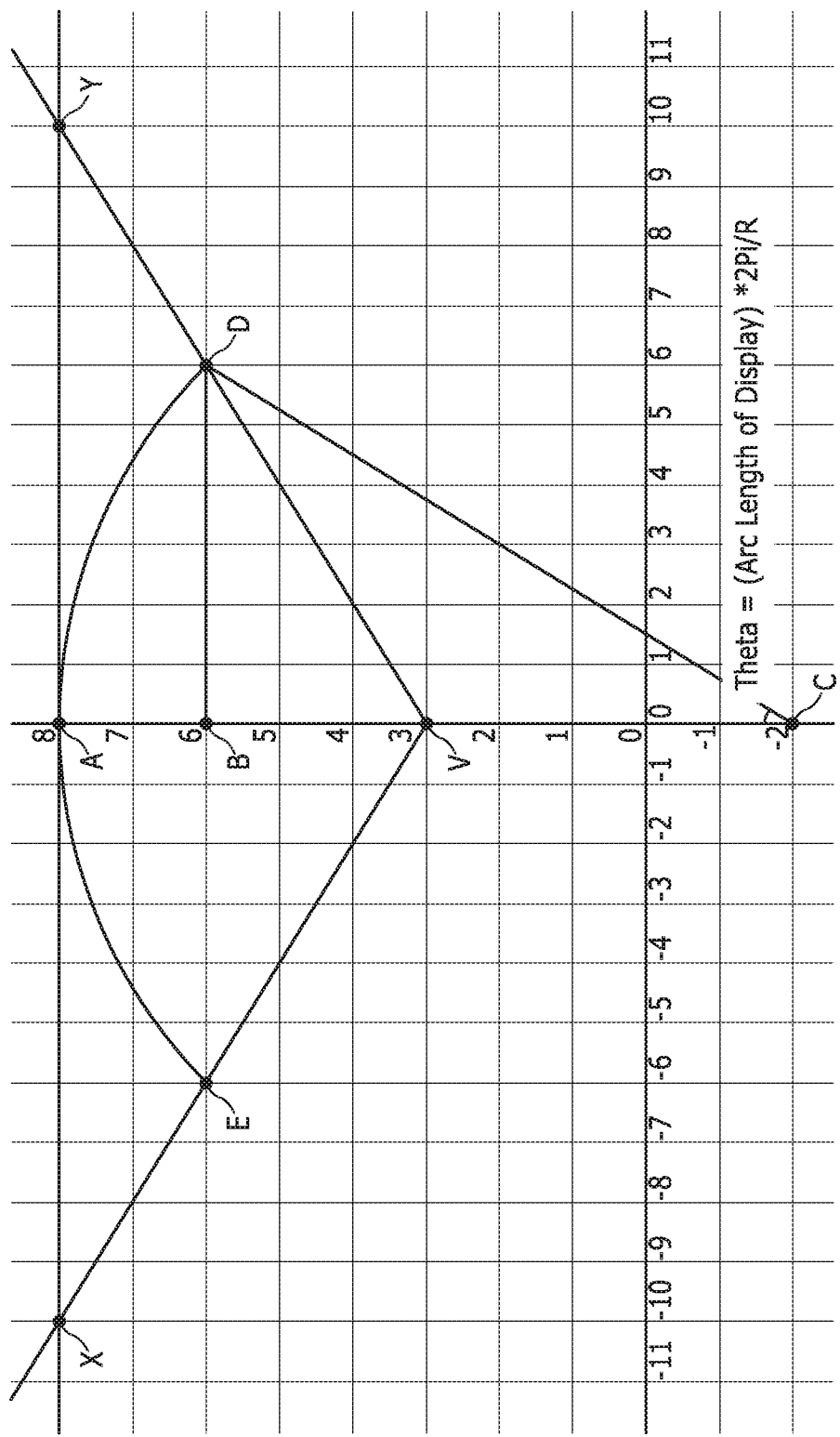
FIG. 10 is an exemplary pictorial representation of a bounding box calculation technique in accordance with one embodiment set forth in the disclosure.

FIG. 10 illustrates an exemplary pictorial representation of a bounding box calculation technique. In one example shown in FIG. 8, the bounding box 800 is defined by a first end point 810 and a second opposite end point 812 disposed on the larger virtual rendering surface 802 wherein the first end point is crossed by a first ray 814 projecting from the viewing position point 808 and passing through a first outermost lateral edge 816 of the physical curved display screen 126, and the second end point is crossed by a second ray 818 projecting from the viewing position point 808 and passing through a second opposite outermost lateral edge 820 of the physical curved display screen 126. It is advantageous that the bounding box 800 contains more virtual pixels than prior systems that are represented by the physical pixels of the curved displays 306, 307, 309.

More specifically, referring now to FIGS. 8 and 10, a segment $\overline{XY}$ represents a width of the bounding box 800, wherein a point X denotes the first end point 810 representing the first delimiting virtual pixel of the bonding box 800 on the virtual rendering surface 802, a point Y denotes the second end point 812 representing the second delimiting virtual pixel of the virtual rendering surface 802. In this example, a point V denotes the viewing position point 808, a point E denotes the first outermost lateral edge 816 of the physical curved display screen 126, and a point D denotes the second opposite outermost lateral edge 820 of the physical curved display screen 126.

In this example, a point C denotes a center of curvature of the physical curved display screen 126 having a curved segment $\widehat{ED}$, and a point A denotes a center of the physical curved display screen 126 dividing the curved segment $\widehat{ED}$ in half. Thus, a segment $\overline{CD}$ denotes a radius R of the curvature of the physical curved display screen 126. A segment $\overline{BD}$ meets a segment $\overline{AV}$ at a right angle (90 degrees), and thus a triangle $\triangle BCD$ is a right angle triangle. Similarly, a triangle $\triangle BVD$ is also a right angle triangle. An angle $\theta$ denotes $\angle BCD$ of the triangle $\triangle BCD$.

In one embodiment, the segment $\overline{BD}$ is defined by expression (1):

$$\overline{BD} = R\sin\theta \qquad (1).$$

In one embodiment, the segment $\overline{BC}$ is defined by expression (2):

$$\overline{BC} = R\cos\theta \qquad (2).$$

In one embodiment, the segment $\overline{BV}$ is defined by expression (3):

$$\overline{BV} = d_{viewing} - \overline{AB} \qquad (3)$$

wherein $d_{viewing}$ denotes a segment $\overline{AV}$.

In one embodiment, the segment $\overline{AB}$ is defined by expressions (4) and (5):

$$\overline{AB} = R - \overline{BC} \qquad (4); \text{ and}$$

$$\overline{AB} = R - R\cos\theta \qquad (5).$$

In one embodiment, the segment $\overline{AY}$ is defined by expressions (6) and (7):

$$\frac{\overline{AY}}{\overline{BD}} = \frac{\overline{BV} + \overline{AB}}{\overline{BV}}; \text{ and} \qquad (6)$$

$$\overline{AY} = \frac{\overline{BD}(\overline{BV} + \overline{AB})}{\overline{BV}}. \qquad (7)$$

In one embodiment, as a result, a width of the bounding box $W_{desktop}$ denoting the segment $\overline{XY}$ is defined by expressions (8)-(12):

$$W_{desktop} = 2\overline{AY} = \frac{2\overline{BD}(\overline{BV} + \overline{AB})}{\overline{BV}}; \qquad (8)$$

$$W_{desktop} = \frac{2(R\sin\theta)(d_{viewing} - \overline{AB} + \overline{AB})}{d_{viewing} - \overline{AB}}; \qquad (9)$$

$$W_{desktop} = \frac{2(R\sin\theta)d_{viewing}}{d_{viewing} - R + R\cos\theta}; \qquad (10)$$

$$W_{desktop} = \frac{2d_{viewing}\sin\theta}{d_{viewing}/R + \cos\theta - 1}; \text{ and} \qquad (11)$$

$$W_{desktop} = \frac{2d_{viewing}\sin\left(\frac{[\text{Arc Length of Display}]}{2R}\right)}{d_{viewing}/R + \cos\left(\frac{[\text{Arc Length of Display}]}{2R}\right) - 1} \qquad (12)$$

wherein [Arc Length of Display] denotes the curved segment $\widehat{ED}$.

Figure 11:
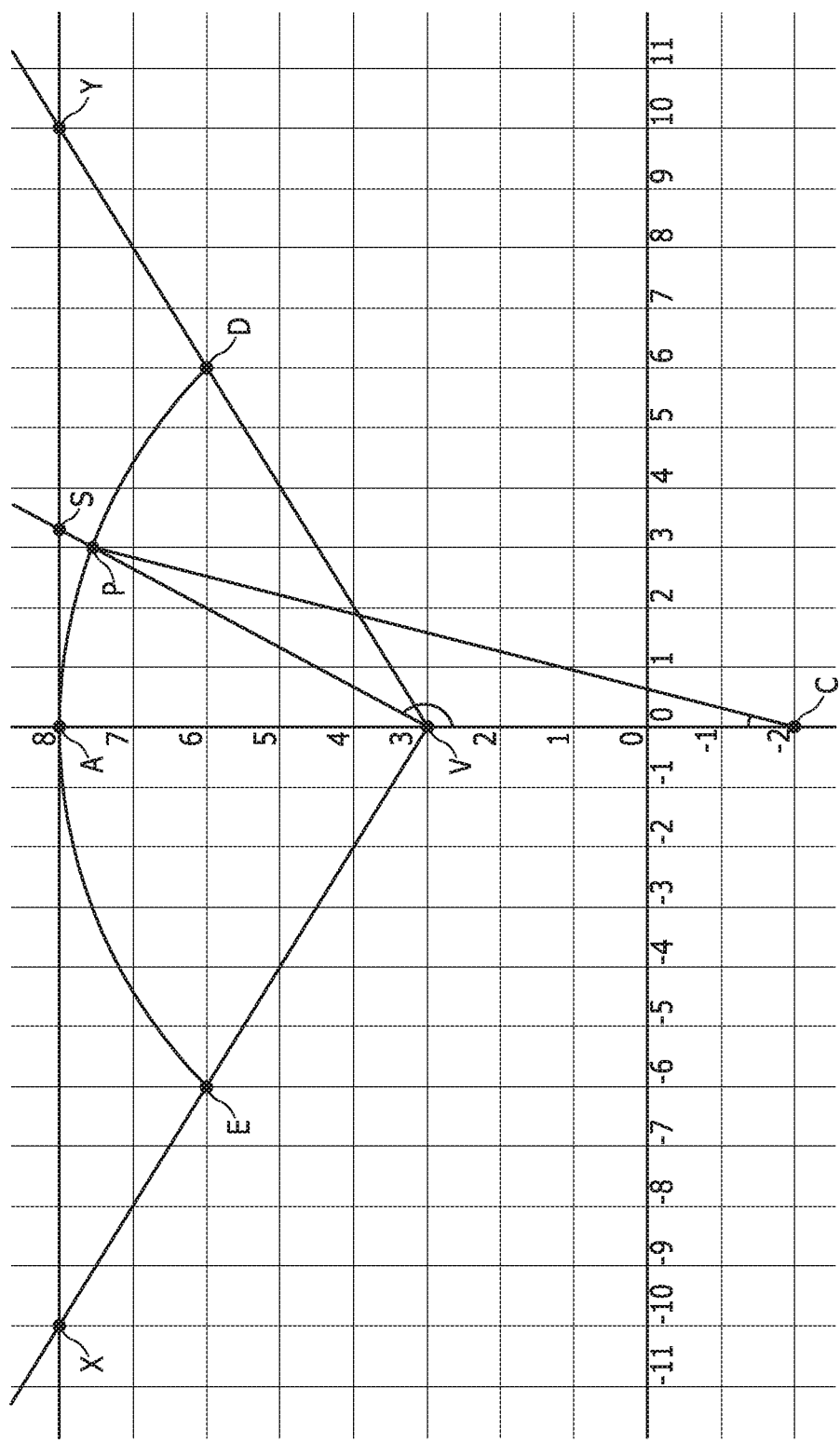
FIG. 11 is an exemplary pictorial representation of a mapping technique between the virtual pixels and the physical pixels in accordance with one embodiment set forth in the disclosure.

FIG. 11 is an exemplary pictorial representation of a mapping technique between the virtual pixels and the physical pixels. FIG. 11 includes identical points designated X, Y, V, A, B, C, D, E shown in FIG. 10, and a point P denotes a pixel index value of a physical pixel (e.g., element 900 in FIG. 9) and a point S denotes a pixel index value of a virtual pixel (e.g., element 904 or 910 in FIG. 9). For example, for a physical curved display having a screen resolution of 1920×1080 pixels, the point P will range between a beginning index value of zero (0) and an ending index value of 1919.

In this example, using two angles $\alpha_p$ and $\beta_p$, an offset distance $\overline{AS}$ is calculated to determine a specific position S in the virtual pixel (e.g., element 904 or 910 in FIG. 9) with respect to the corresponding position P in the physical pixel (e.g., element 920 or 922 in FIG. 9). A first angle $\alpha_p$ denotes ∠VCP of the triangle ΔPVC at the position P, and a second angle $\beta_p$ denotes ∠PVC of the triangle ΔPVC at the position P. In this example, since the segment $\overline{AX}$ and the segment $\overline{AY}$ are symmetrical, the same results generated from calculations for pixels in the segment $\overline{AY}$ can be applied to the pixels in the other segment $\overline{AX}$ without duplicating the calculation effort.

Referring now to FIGS. 9 and 11, a first offset distance $\overline{AS'}$ is calculated to determine a first or beginning virtual pixel position S' in the virtual pixel 904, and a second offset distance $\overline{AS''}$ is calculated to determine a second or ending virtual pixel position S'' in the virtual pixel 910. An exemplary value of position S' is a fractional number, such as 2.5, and similarly, an exemplary value of position S'' is a fractional number, such as 5.3. Thus, a delta value or difference between the first and second virtual pixel positions S' and S'' represents a width of the mapped virtual pixels (e.g., 904-910 shown in FIG. 9).

Returning now to FIG. 11, in one embodiment, the first angle $\alpha_p$ is defined by expression (13):

$$\alpha_p = \frac{p}{h_{res}}\left(\frac{[\text{Arc Length of Display}]}{R}\right) \qquad (13)$$

wherein [Arc Length of Display] denotes the curved segment $\widehat{ED}$, P denotes a pixel index value of a physical pixel in the curved display, R denotes the radius of the curved display, and $h_{res}$ denotes a maximum value of a horizontal resolution.

In one embodiment, the segment $\overline{VP}_p$ is defined by expressions (14) and (15):

$$\overline{VP}_p = \sqrt{R^2 + (R - d_{viewing})^2 - 2R(R - d_{viewing})\cos\alpha_p} \text{ ; and} \qquad (14)$$

$$\frac{\sin\theta}{\overline{VP}_p} = \frac{\sin(\pi - \theta - \beta)}{R - d_{viewing}} \qquad (15)$$

wherein $d_{viewing}$ denotes a segment $\overline{AV}$, and angle θ denotes ∠BCD of the triangle ΔBCD.

In one embodiment, the second angle $\beta_p$ is defined by expressions (16) and (17):

$$\sin(\pi - \theta - \beta_p) = \frac{(R - d_{viewing})\sin\theta}{\sqrt{R^2 + (R - d_{viewing})^2 - 2R(R - d_{viewing})\cos\alpha_p}}; \text{ and} \qquad (16)$$

$$\beta_p = \pi - \theta - \sin^{-1}\left(\frac{(R - d_{viewing})\sin\theta}{\sqrt{R^2 + (R - d_{viewing})^2 - 2R(R - d_{viewing})\cos\alpha_p}}\right). \qquad (17)$$

In one embodiment, the offset segment $\overline{AS}_p$ is defined by expressions (18) and (19):

$$\overline{AS}_p = d_{viewing}\tan(\pi - \beta_p); \text{ and} \qquad (18)$$

$$\overline{AS}_p[\text{pixels}] = \overline{AS}_p(DPI_{display}) = \frac{d_{viewing}\tan(\pi - \beta_p)h_{res}}{[\text{Arc Length of Display}]} \qquad (19)$$

wherein [pixels] denotes a predetermined constant value used for a unit conversion, $DPI_{display}$ denotes another predetermined constant value used for the unit conversion of the curved display (e.g., converting from a metric unit to a dot-per-inch (DPI) unit). When P is equal to zero (0), $\overline{AS}_0=0$ and $\alpha_0=0$.

In one embodiment, an exemplary display data DisplayPixel$_i$ of an $i_{TH}$ physical pixel representing color information of the mapped virtual pixels having an index k is defined by expressions (20) and (21):

$$DisplayPixel_i = \qquad (20)$$

$$\frac{1}{\overline{AS}_{i+1} - \overline{AS}_i + 1} \sum_{k=0}^{ceiling(\overline{AS}_{i+1})-ceiling(\overline{AS}_i)} wRGB_{k+ceiling(\overline{AS}_i)-1}; \text{ and}$$

$$w = \begin{cases} ceiling(\overline{AS}_i) - \overline{AS}_i, & k=0 \\ 1, & 0 < k < ceiling(\overline{AS}_{i+1}) - ceiling(\overline{AS}_i) \\ \overline{AS}_{i+1} - floor(\overline{AS}_{i+1}), & k = ceiling(\overline{AS}_{i+1}) - ceiling(\overline{AS}_i) \end{cases} \qquad (21)$$

wherein w denotes a weighting factor value, and RGB denotes a color value When i is equal to zero (0), $\overline{AS}_0 > 0$ (e.g., $\overline{AS}_0 = 0.1$). Other suitable weighting techniques are also contemplated to suit different applications. In this example, RGB values from multiple virtual pixels are combined into one RGB value of a single physical pixel using the weighted sampling w. In another example, the display data DisplayPixel$_i$ represents the pixel information the $i_{TH}$ physical pixel including intensity, contrast, and the like, for reducing a virtual pixel count (i.e. when there are more virtual pixels than a corresponding physical pixel). Exemplary calculations shown above are independently performed, but neighboring physical pixels can take advantage of already computed display data of other physical pixels to improve performance to suit different applications.

Among other advantages, as described above, the method and apparatus provides increased image content and/or enhanced image quality on the display device by reducing or eliminating image distortions associated with curved displays. A non-constant scale ratio among a plurality of differing physical pixels in at least one row of a portion of the physical curved display screen provides the increased image content and the enhanced image characteristics on the curved displays. As such, the non-constant scale ratio provides an enhanced mapping technique between the virtual pixels and the physical pixels based on the field-of-view point reference data and the display curvature data.

The above detailed description of the present disclosure and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

What is claimed is:

1. A method, by a computing device, for providing pixel information for display, the method comprising:
    mapping, using the computing device, pixel information of a virtual rendering surface to a physical curved display screen based on field-of-view point reference data and display curvature data of one or more curved displays using a scaled ratio, wherein using the scaled ratio comprises applying virtual pixels in the virtual rendering surface to a plurality of differing physical pixels in at least one row of a portion of the physical curved display screen, wherein the scaled ratio is a non-constant value that defines more than one virtual pixel to a single physical pixel and varies the number of virtual pixels to be applied to the plurality of differing physical pixels in the at least one row of the portion of the physical curved display screen based on the field-of-view point reference data and the display curvature data; and
    outputting, using the computing device, display data based on the mapped pixel information for display to the one or more curved displays.

2. The method of claim 1, wherein using the scaled ratio comprises at least one of: increasing and decreasing a different number of virtual pixels based on a location of the single physical pixel on the physical curved display screen with respect to the field-of-view point reference data.

3. The method of claim 1, wherein mapping the pixel information of the virtual rendering surface comprises:
    detecting a change in a field-of-view point;
    automatically tracking the change in the field-of-view point; and
    changing the mapping of the pixel information of the virtual rendering surface to the physical curved display screen based on the detected change.

4. The method of claim 1, wherein mapping the pixel information of the virtual rendering surface comprises determining the display curvature data based on display capability attribute data associated with the one or more curved displays.

5. The method of claim 4, wherein mapping the pixel information of the virtual rendering surface comprises generating a bounding box having a plurality of rows of virtual pixels that delimits at least a portion of the virtual rendering surface that is to be displayed on the physical curved display screen based on the field-of-view point reference data and the display curvature data.

6. The method of claim 5, wherein mapping the pixel information of the virtual rendering surface comprises calculating, in response to generating the bounding box of the virtual rendering surface, the scaled ratio for at least one row of the plurality of rows of virtual pixels in the bounding box by associating more than one virtual pixel to the single physical pixel of the physical curved display screen such that the single physical pixel represents the associated more than one virtual pixel.

7. The method of claim 6, wherein mapping the pixel information of the virtual rendering surface comprises mapping the single physical pixel of the physical curved display screen to the associated more than one virtual pixel for at least one row of the plurality of rows of virtual pixels in the bounding box.

8. The method of claim 1, wherein, prior to mapping the pixel information of the virtual rendering surface to the physical curved display screen, generating, using the computing device, the virtual rendering surface corresponding to a two-dimensional screen space relative to the field-of-view point reference data.

9. The method of claim 1, wherein outputting the display data based on the mapped pixel information for display comprises generating the display data of the plurality of differing physical pixels of the physical curved display screen that represent corresponding virtual pixels of the virtual rendering surface.

10. The method of claim 9, further comprising displaying the plurality of differing physical pixels on the one or more curved displays based on the display data.

11. The method of claim 1, wherein using the scaled ratio comprises applying entire and partially corresponding virtual pixels to the single physical pixel.

12. A computing device having at least one processor operative to provide pixel information for display, the at least one processor being configured to: map pixel information of a virtual rendering surface to a physical curved display screen based on field-of-view point reference data and display curvature data of one or more curved displays using a scaled ratio, wherein using the scaled ratio comprises applying virtual pixels in the virtual rendering surface to a plurality of differing physical pixels in at least one row of a portion of the physical curved display screen, wherein the scaled ratio is a non-constant value that defines more than one virtual pixel to a single physical pixel and varies the number of virtual pixels to be applied to the plurality of differing physical pixels in the at least one row of the physical curved display screen based on the field-of-view point reference data and the display curvature data; and output display data based on the mapped pixel information for display to the one or more curved displays.

13. The computing device of claim 12, wherein the at least one processor is further configured to:

detect a change in a field-of-view point;

automatically track the change in the field-of-view point; and change the mapping of the pixel information of the virtual rendering surface to the physical curved display screen based on the detected change.

14. The computing device of claim 12, wherein the at least one processor is further configured to:

generate a bounding box having a plurality of rows of virtual pixels that delimits at least a portion of the virtual rendering surface that is to be displayed on the physical curved display screen based on the field-of-view point reference data and the display curvature data.

15. The computing device of claim 14, wherein the at least one processor is further configured to:

calculate, in response to generating the bounding box of the virtual rendering surface, the scaled ratio for at least one row of the plurality of rows of virtual pixels in the bounding box by associating more than one virtual pixel to the single physical pixel of the physical curved display screen such that the single physical pixel represents the associated more than one virtual pixel.

16. The computing device of claim 15, wherein the at least one processor is further configured to:

map the single physical pixel of the physical curved display screen to the associated more than one virtual pixel for at least one row of the plurality of rows of virtual pixels in the bounding box.

17. The computing device of claim 12, wherein the at least one processor is further configured to:

generate the display data of the plurality of differing physical pixels of the physical curved display screen that represent corresponding virtual pixels of the virtual rendering surface; and display the plurality of differing physical pixels on the one or more curved displays based on the display data.

18. A non-transitory computer readable storage medium comprising executable instructions that when executed by at least one processor cause the at least one processor to:

map pixel information of a virtual rendering surface to a physical curved display screen based on field-of-view point reference data and display curvature data of one or more curved displays using a scaled ratio, wherein using the scaled ratio comprises applying virtual pixels in the virtual rendering surface to a plurality of differing physical pixels in at least one row of a portion of the physical curved display screen, wherein the scaled ratio is a non-constant value that defines more than one virtual pixel to a single physical pixel and varies the number of virtual pixels to be applied to the plurality of differing physical pixels in the at least one row of the portion of the physical curved display screen based on the field-of-view point reference data and the display curvature data; and output display data based on the mapped pixel information for display to the one or more curved displays.

19. The non-transitory computer readable storage medium of claim 18, further comprising executable instructions that when executed by the at least one processor cause the at least one processor to:

detect a change in a field-of-view point, automatically track the change in the field-of-view point, and change the mapping of the pixel information of the virtual rendering surface to the physical curved display screen based on the detected change;

generate a bounding box having a plurality of rows of virtual pixels that delimits at least a portion of the virtual rendering surface that is to be displayed on the physical curved display screen based on the field-of-view point reference data and the display curvature data;

calculate, in response to generating the bounding box of the virtual rendering surface, the scaled ratio for at least one row of the plurality of rows of virtual pixels in the bounding box by associating more than one virtual pixel to the single physical pixel of the physical curved display screen such that the single physical pixel represents the associated more than one virtual pixel; and map the single physical pixel of the physical curved display screen to the associated more than one virtual pixel for at least one row of the plurality of rows of virtual pixels in the bounding box.

20. The non-transitory computer readable storage medium of claim 18, further comprising executable instructions that when executed by the at least one processor cause the at least one processor to:

generate the display data of the plurality of differing physical pixels of the physical curved display screen that represent corresponding virtual pixels of the virtual rendering surface; and display the plurality of differing physical pixels on the one or more curved displays based on the display data.

* * * * *